(12) United States Patent
Nijdam et al.

(10) Patent No.: US 12,264,702 B2
(45) Date of Patent: Apr. 1, 2025

(54) WALL MOUNTING BRACKET FOR A MOUNTING RAIL AND METHOD OF MANUFACTURE THEREOF

(71) Applicant: J. VAN WALRAVEN HOLDING B.V., Mijdrecht (NL)

(72) Inventors: Frank Nijdam, Harderwijk (NL); Marek Juzak, Mijdrecht (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 119 days.

(21) Appl. No.: 18/008,737

(22) PCT Filed: Jun. 14, 2021

(86) PCT No.: PCT/EP2021/065874
§ 371 (c)(1),
(2) Date: Dec. 7, 2022

(87) PCT Pub. No.: WO2021/254921
PCT Pub. Date: Dec. 23, 2021

(65) Prior Publication Data
US 2023/0213052 A1 Jul. 6, 2023

(30) Foreign Application Priority Data
Jun. 18, 2020 (NL) .................................... 2025855

(51) Int. Cl.
*F16B 9/00* (2006.01)
*E04F 11/18* (2006.01)

(52) U.S. Cl.
CPC .......... *F16B 9/052* (2018.08); *E04F 11/1804* (2013.01); *F16B 9/058* (2018.08)

(58) Field of Classification Search
CPC ............... E04F 11/1802; E04F 11/1804; E04F 11/1812; E04H 12/2261; E04H 12/2269;
(Continued)

(56) References Cited

U.S. PATENT DOCUMENTS 765,382 A 7/1904 Fleming
1,830,702 A 11/1931 Johnson
(Continued)

FOREIGN PATENT DOCUMENTS

DE 202010009540 U1 9/2010
EP 1589626 A1 10/2005
EP 3555975 A1 10/2019

OTHER PUBLICATIONS

International Search Report and Written Opinion for PCT/EP2021/065874 dated Sep. 17, 2021 (13 pgs).
Search Report for NL 2025855 dated Jun. 18, 2020 (9 pgs).

*Primary Examiner* — Josh Skroupa
(74) *Attorney, Agent, or Firm* — Tutunjian & Bitetto, P.C.

(57) ABSTRACT

A wall mounting bracket for mounting an elongate mounting rail as a cantilever arm to a wall or other supporting surface is provided including a wall plate having mounting holes for mounting the bracket to a wall by means of male fasteners, and a socket for inserting the end portion of the mounting rail, including at least two flange profiles, which at their distal end have an embracing portion to interlock with the end portion of the mounting rail thereby inhibiting movement of an inserted end portion parallel to the wall plate. At least one of the embracing portions has a fixing hole for passing through a male fastener to fix the end portion of the mounting rail to inhibit retraction of the end portion from the socket. A supporting rim is provided to interlock with the outer or inner side of the end portion of the mounting rail.

18 Claims, 4 Drawing Sheets

(58) Field of Classification Search
CPC ............ E04H 12/2276; E04H 17/1447; E04H 17/1488; E04H 17/17; F16B 9/052; F16B 9/058; Y10T 403/46; Y10T 403/4608; Y10T 403/4611; Y10T 403/4631; Y10T 403/4691; Y10T 403/4694
USPC ......... 256/65.03, 65.04, 65.05, 65.06, 65.08, 256/65.14, 65.16; 403/230, 233, 234, 403/241, 262, 263
See application file for complete search history.

(56) References Cited

U.S. PATENT DOCUMENTS

| | | | |
|---|---|---|---|
| 3,131,899 A * | 5/1964 | Luhrs ...................... | F16B 9/052 403/189 |
| 3,190,598 A | 6/1965 | Wilf | |
| 5,123,623 A * | 6/1992 | McNamara ......... | E04H 12/2215 248/156 |
| 6,213,452 B1 * | 4/2001 | Pettit .................. | E04F 11/1812 256/65.14 |
| 7,125,002 B2 * | 10/2006 | Platt .................... | E04H 17/1488 256/65.03 |
| 7,677,000 B2 * | 3/2010 | Walker ................ | E04F 11/1812 248/539 |
| 8,141,830 B1 * | 3/2012 | Hudson ............... | E04G 21/1808 33/408 |
| 8,783,662 B1 * | 7/2014 | Russo ................. | E04H 17/1417 256/65.03 |
| 8,936,233 B1 | 1/2015 | Sneith | |
| 9,816,286 B2 * | 11/2017 | Cavanagh ........... | E04H 12/2269 |
| 10,344,483 B2 * | 7/2019 | Yu ....................... | E04F 11/1812 |
| 2018/0127991 A1 * | 5/2018 | Subzda ............... | E04G 21/3223 |

\* cited by examiner

WALL MOUNTING BRACKET FOR A MOUNTING RAIL AND METHOD OF MANUFACTURE THEREOF

FIELD OF THE INVENTION

The present invention relates to a metal wall mounting bracket for mounting an elongate mounting rail as a cantilever arm to a wall or other supporting surface.

DESCRIPTION OF RELATED ART

Metal wall mounting brackets for a mounting rail are well known in the art. Common brackets consist of a wall plate for mounting the bracket to a wall and a rail supporting piece of steel welded to the wall plate. The rail supporting piece then receives a (profiled) mounting rail, which rail is often attached to the supporting piece by means of clamping and/or slide nuts and screws. The assembly of the metal wall mounting bracket and the mounting rail is known as a cantilever arm. Typically, these cantilever arms are used to support or suspend installation components, for example an installation system for pipes and/or machinery.

It is a disadvantage of these commonly known brackets that the rail supporting piece is welded to the wall plate. Firstly, welding is not only a costly process but it also infers weld quality risks, given that in these known brackets the weld is a load-bearing connection between the wall plate and the rail. Secondly, welding precludes the use of pre-galvanised materials, as when welding pre-galvanised materials the weld quality suffers and toxic fumes are produced. As a result, untreated materials are often used for brackets that require welding, which are then galvanised after welding. This complicates the manufacturing process.

DE 196 13 795 discloses a cantilever arm for which a rail is joined with the wall plate by means of a mechanical connection, thereby foregoing the need for a weld. However, it is a disadvantage of this known cantilever arm that the wall plate in DE 196 13 795 does not provide sufficient reinforcement for the load-bearing mechanical connection between the wall plate and the rail onto which loads on the rail are transferred.

It is an object of the invention to provide an improved metal wall mounting bracket for a cantilever arm, which mitigates the problems induced by welding, whilst providing improved reinforcement.

This object is achieved by a metal wall mounting bracket according to the invention.

SUMMARY

A metal wall mounting bracket for mounting an elongate mounting rail, e.g. a generally C-shaped profiled section element, as a cantilever arm to a wall or other supporting surface. The bracket is adapted to position and hold an end portion of the mounting rail in the bracket and fix said end portion to the bracket by means of at least one mechanical fastener. The bracket comprises:
  a wall plate having a wall engagement side to be positioned against the wall or other support surface and a front side opposite the wall engagement side, wherein mounting holes extend from the front side to the wall engagement side for mounting the bracket to the wall by means of male fasteners, wherein the bracket furthermore comprises:
  a socket located on the front side of the wall plate for inserting the end portion of the mounting rail, said socket comprising at least two flange profiles formed monolithically with the wall plate, and having a proximal end connected to the wall plate and a distal end remote from the wall plate, wherein the flange profiles at the distal end have an embracing portion configured to embrace together the end portion of the mounting rail, so as to interlock with the outer side of the end portion of the mounting rail thereby inhibiting movement of an inserted end portion parallel to the mounting plate, and wherein at least one of the embracing portions has a fixing hole for passing through a male fastener to fix the end portion of the mounting rail so as to inhibit retraction of the end portion of the rail from the socket,
  a supporting rim formed monolithically on the front side of the wall plate within the socket, said supporting rim being configured to interlock with the outer side or the inner side of the end portion of the mounting rail thereby inhibiting movement of an inserted end portion parallel to the mounting plate.

The bracket according to the invention comprises a socket, comprising at least two flange profiles having an embracing portion remote from the wall plate, and a supporting rim formed on the wall plate. The embracing portion and the supporting rim may be both configured to interlock with the outer side of the end portion of the mounting rail, thereby inhibiting movement of an inserted end portion parallel to the mounting plate. Alternatively, the embracing portion may be configured to interlock with the outer side of the end portion of the mounting rail and the supporting rim may be configured to be inserted in the open end of the mounting rail and to interlock with the inner side of the end portion of the mounting rail.

Effectively, the bracket provides a two-point bearing of a load. This leads to a reinforced load-bearing connection between the bracket and the mounting rail.

Also is noted that the bracket is monolithically formed, thus in one piece, including the wall plate, the two flange profiles and the supporting rim. This is advantageous in that only one part is produced, and that no further assembly and/or welding of the bracket itself would be required. As no welding is required, it also means that pre-galvanised materials can be used to manufacture the wall mounting bracket. This further simplifies the manufacturing process.

It is a further advantage of a monolithically formed wall mounting bracket that material characteristics are relatively uniform throughout. This leads to load bearing of a uniform quality, as there are no connections between separate parts that may prove to be a weak link or that may require particular reinforcement strategies.

In a possible embodiment, the supporting rim is formed as a bent rim of a hole in the plate. This allows for a supporting rim that is monolithically formed with the wall plate. Additionally, it aids in the ease of manufacture of the supporting rim.

In a possible embodiment, the flange profiles are formed by bending. This allows for flange profiles that are monolithically formed with the wall plate. Additionally, it aids in the ease of manufacture of the supporting rim.

In a further possible embodiment, the wall mounting bracket is made by casting or moulding. This leads to a monolithically formed bracket.

In a possible embodiment, the flange profiles taper from the respective proximal end towards the embracing portions. The tapering of the flange profiles leads to increased bending stiffness of the socket in the vertical direction. This increase in bending stiffness due to a tapering profile can also be referred to as bracing.

In a possible embodiment, the flange profiles are inclined towards each other from the proximal ends towards the embracing portions. This inclination provides further bracing to the socket. Hence, it leads to increased bending stiffness, also in the lateral direction.

In a preferred embodiment, the socket comprises two opposite flange profiles.

In a further embodiment, the embracing portions have a U-shaped profile, wherein the open sides of the U-shaped profiles face each other. As a result of the U-shaped profile, the embracing portions each engage with the mounting rail on an upper side, a left/right side, and a lower side thereof. This provides additional support to the connection between the embracing portions and the mounting rail. It should be appreciated that further cross-sectional shapes of the embracing portions are of course conceivable, e.g. L-shaped.

In yet a further embodiment, the support rim has a rectangular shape. This rectangular shape preferably has a closed contour with rounded corners. The rectangular shape allows for positioning and holding an end portion of the mounting rail in the bracket. Typically, the outer contour of the cross-sections of these mounting rails form a rectangular shape. It should be noted that alternatively the support rim and/or mounting rail may have other shapes.

In a possible embodiment, the rim is aligned with the embracing portion of the flange profile. This leads to an efficient two-point bearing of a load. The rim and the embracing portions efficiently share the load and it prevents twisting or bending moments as a result sharing said load out of plane.

In a possible embodiment, an inner side of the supporting rim interlocks with an outer side of the end portion of the mounting rail.

In a possible embodiment, an outer side of the supporting rim interlocks with an inner side of the end portion of the mounting rail.

In a practical embodiment, the bracket is formed from a sheet metal blank. In a further practical embodiment, the sheet metal blank is pre-galvanised. The latter is advantageous as it leads to a cheaper and more efficient manufacturing process.

The invention also relates to a cantilever arm assembly comprising a wall mounting bracket as set out in the foregoing and a mounting rail which is inserted with an end portion in the socket of the bracket and engages the supporting rim of the bracket. As a result an end portion of the mounting rail interlocks with the socket and the supporting rim. The inner contour of the socket, the inner or outer contour of the supporting rim and the outer contour and possibly the inner contour of the end portion of the mounting rail being dimensioned to mate with each other. The interlocking of the socket and the supporting rim inhibits movement of the inserted rail end portion parallel to the mounting plate. The outer and possibly the inner contour of the mounting rail may fully or partially match the shape of the cross-section of the socket and/or the supporting rim of the bracket.

In a possible embodiment, the mounting rail has a C-shaped cross-section. This allows for the sturdy mounting of an installation elements for e.g. pipes and/or machinery to the mounting rail. It should be noted that this is just one example of a possible cross-section of a mounting rail. Depending on the application a mounting rail with another suitable cross-section may be opted for.

The invention also relates to a method for manufacturing a metal wall mounting bracket according to the present principles.

In particular, the invention also relates to a method for manufacturing a metal wall mounting bracket according to the present application, wherein:
- a flat sheet metal blank is provided;
- a central opening with an upstanding rim is punched in the blank,
- the outer contour of the unfolded bracket is punched or cut from the blank;
- one or more mounting holes and one or more fixing holes are punched or cut,
- the flange profiles are bent out of the plane of the sheet metal blank,
- the flange profiles are formed to a profile having a U-shaped cross section at the distal end portion thereof.

In a practical embodiment, the sheet metal blank is made of a pre-galvanised metal. This is advantageous as it leads to a cheaper and more efficient manufacturing process.

The invention will be elucidated in the following description with reference to the drawings, in which like reference symbols designate like parts.

DETAILED DESCRIPTION

Figure 1:
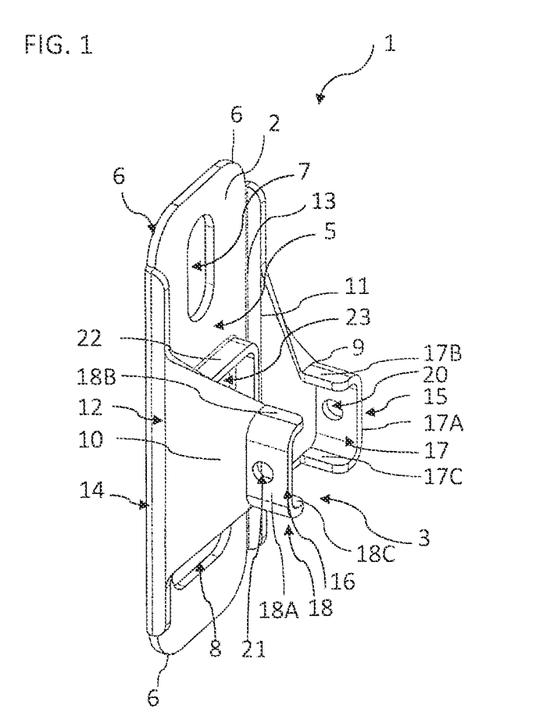
FIG. 1 shows a view in perspective of a wall mounting bracket according to the invention.

In FIG. 1 is shown a metal wall mounting bracket 1, generally comprising a wall plate 2 and a socket 3. The metal wall mounting bracket 1 may be formed from a flat sheet metal blank, which sheet metal blank is preferably pre-galvanised. Alternatively, the metal wall mounting bracket 1 may be formed by casting or moulding a metal.

The wall plate 2 has an engagement side 4, which is to be positioned against a wall, or any other support surface, and a front side 5 which is opposite to the engagement side 4. The wall plate 2 of this specific embodiment has a generally rectangular shape with rounded corners 6.

The wall plate 2 further has oblong mounting holes 7 and 8 which extend from the front side 5 to the engagement side 4. The mounting holes 7 and 8 are positioned centrally in an upper half and a lower half of the wall plate 2, respectively. The mounting holes 7 and 8 can be used to mount the wall mounting bracket 1 to a wall, or any other support surface, by means of male fasteners, such as e.g. screws or bolts. Suitable male fasteners may be chosen based on the intended use and/or loading on the bracket 1. The mounting holes 7 and 8 each have an oblong shape with a longitudinal axis. The longitudinal axes of the holes 7 and 8 are perpendicular to each other such that the position and orientation of the bracket 1 can be adjusted while attaching of the bracket 1 to the wall.

The socket 3 is located on the front side 5 and comprises two opposite flange profiles 9 and 10. The flange profiles 9 and 10 are formed at opposite edges of the wall plate 2 and are bent out of the plane of the wall plate 2. The flange profiles 9 and 10, respectively, have a proximal end 11 and 12, respectively that is connected to the wall plate 2. Respective bending lines 13 and 14 about which the flange profiles 9 and 10 are bent are schematically shown in FIG. 1.

The respective flange profiles 9 and 10 have respective distal ends 15 and 16 remote from the wall plate 2. The flange profiles 9 and 10 each have an embracing portion 17, 18 at the distal ends 15, 16, which embracing portions are opposite each other. The embracing portions 17, 18 have a U-shaped profile and are facing each other with the open side of the U-shape. Thus the embracing portions 17 and 18 are arranged and configured to embrace together the end portion of a mounting rail 100.

In FIG. 1 the flange profiles 9 and 10 can be seen to taper from their respective proximal ends 11, 12 towards these embracing portions 17, 18. The tapering of the flange profiles 9, 10 leads to increased bending stiffness of the socket 3 in the vertical direction. Additionally, the flange profiles 9, 10 are inclined towards each other from the proximal ends 11, 12 towards the embracing portions 17,18; thereby providing further bracing of the socket 3.

Between them, the embracing portions 17, 18 define a space 19 which is shielded laterally by sides 17A, 18A, and vertically by upper sides 17B, 18B and lower sides 17C, 18C. The space is open at the front and rear side of the embracing portions 17, 18. This space 19 allows for inserting the end portion 100A of the mounting rail 100 as is visible in FIGS. 3 and 4. Upon insertion of the mounting rail 100, an outer side thereof engages an inner side of the embracing portions 17, 18. As a result movement of said end portion 100A parallel to the wall plate 2 is then inhibited.

It should be appreciated that embracing portions 17, 18 may equally have a differently shaped profile, and define the space between them accordingly.

The embracing portions 17, 18 further have fixing holes 20, 21 arranged in the sides 17A, 18A, respectively. These fixing holes 20, 21 may be used for passing through a male fastener to fix the end portion 100A of the mounting rail 100 so as to inhibit retraction of the end portion 100A from the socket 3.

A supporting rim 22 is arranged centrally on the front side 5 and is formed as a bent rim from a hole 23 in the wall plate 2. This allows the supporting rim 22 to be formed monolithically with said wall plate 2. The supporting rim 22 is shown to have a rectangular shape. This is a shape also typical for the outer contour of mounting rails. However, it should be appreciated that other shapes are conceivable.

The supporting rim 22 can receive the end portion 100A of a mounting rail in hole 23. The outer side of said end portion 100A of the mounting rail 100 interlocks with an inner side of the supporting rim 22 when the end portion 100A is inserted. This prevents displacement of the inserted end portion 100A parallel to the mounting plate 2.

Figure 2:
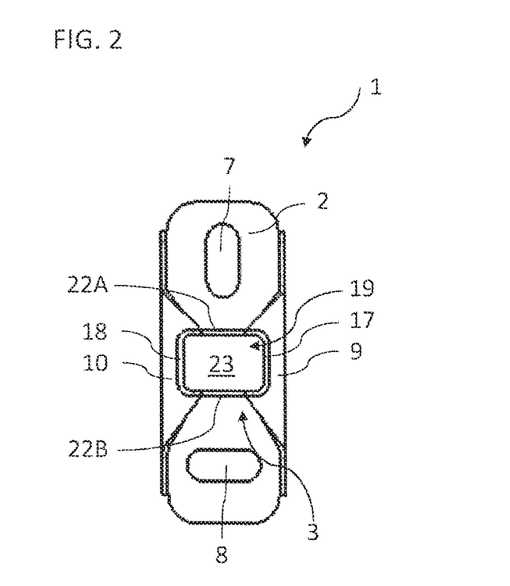
FIG. 2 shows a front elevational view of the wall mounting bracket of FIG. 1.

In FIG. 2 is shown a frontal view of the bracket 1 of FIG. 1. It can be seen that the supporting rim 22 is aligned with the embracing portions 17, 18 that extend from the flange profiles 9, 10 of socket 3. An upper side 22A and a lower side 22B of the rim 22 can be seen through the space that is defined between the embracing portions 17, 18. Having the supporting rim 22 and the socket 3 aligned provides an efficient two-point bearing in case a load is applied to a mounting rail 100 inserted in bracket 1. The supporting rim 22 and the embracing portions 17, 18 efficiently share the load and prevent twisting or bending moments as a result of out of plane sharing of the load.

Figure 3:
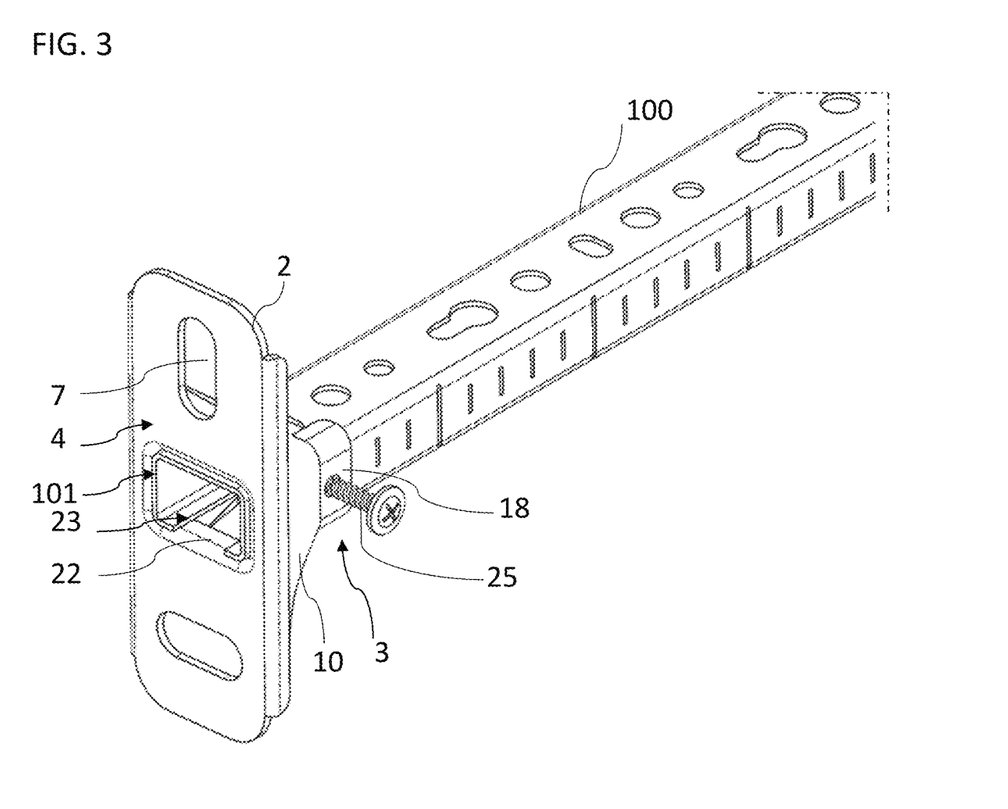
FIG. 3 shows a view in perspective of a cantilever arm assembly comprising the wall mounting bracket of FIG. 1.

In FIG. 3 is shown a cantilever arm assembly comprising the bracket 1 and a mounting rail 100. The mounting rail 100 is inserted with an end portion 100A in the socket 3 and in the supporting rim 22 of the bracket 1. This yields an interlocking of the outer side of said end portion 100A with the inner side of the embracing portions 17, 18 of socket 3 and the inner side of the supporting rim 22, respectively.

As is shown in FIG. 3, a screw 25 extends through the fixing hole 21 in the embracing portion 18 and is screwed into or against a lateral wall of the mounting rail 100. Preferably the screw is a self-tapping screw which is screwed in the lateral wall of the mounting rail 100. This constrains the mounting rail 100 relative to the socket 3. As such e.g. retraction of the mounting rail 100 from the socket 3 is curbed.

The supporting rim 22 is shown to have a rectangular shape. The mounting rail 100 is shown to have a C-shaped cross section 101. The outer contour of the cross-section of said mounting rail 100 matches the shape of the supporting rim 22.

Figure 4:
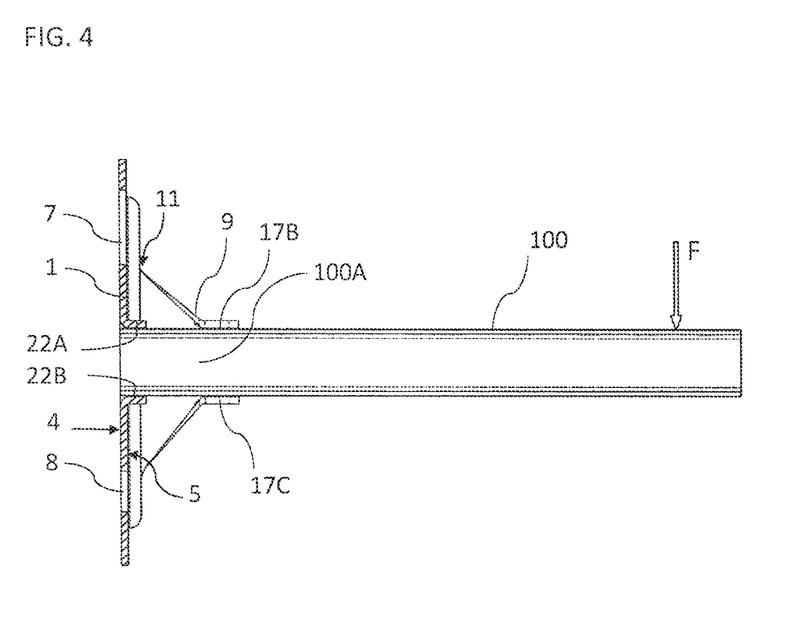
FIG. 4 shows a cross-section through the cantilever arm assembly of FIG. 3.

In FIG. 4 is shown a cross-section through the cantilever arm assembly of FIG. 3. As can be seen in this figure, the cantilever arm assembly is put under a vertical load F. The load F is applied on the mounting rail 100 and is transferred into the wall plate 2 which in this specific embodiment is fixed to a wall at engagement side 4 of wall plate 1.

The embracing portions 17, 18 interlocking with the mounting rail 100 forms a first load-bearing connection. The supporting rim 22 interlocking with the mounting rail 100 forms a second load-bearing connection. These two separate connections lead to a reinforced load-bearing connection between the bracket 1 and the mounting rail 100.

Keeping in mind the vertical bracing provided by the flange profiles 9, 10 of bracket 1; the installation orientation shown in in FIG. 4, and with a vertical load applied to the mounting rail 100, may be considered a preferred arrangement. However, it should be appreciated that a cantilever arm assembly comprising a wall mounting bracket 1 according to the invention can equally handle lateral loads and may be installed in another orientation.

In the embodiment shown in the FIGS. 1-4 the supporting rim 22 has a dimension such that the outer contour of the end of the mounting rail 100 fits on the inner side of the rim 22. Upon mounting the mounting rail 100 in supporting rim 22, the inner side of the supporting rim then interlocks with the outer side of the end portion of the mounting rail 100. It is however also conceivable that the rim 22 has a smaller dimension such that the rim 22 fits inside the inner contour of the open end of the mounting rail 100. Upon mounting the mounting rail 100 in supporting rim 22, the outer side of the supporting rim then interlocks with the inner side of the end portion of the mounting rail.

In a method to manufacture the metal wall mounting bracket 1 as shown in the FIGS. 1-4 is formed from a flat sheet metal blank, which is preferably made of a pre-galvanised metal. In a step of the method a central opening is created in the flat sheet metal blank, e.g. by punching, using for example a hole punch, or by cutting using for example a laser cutter. Then an upstanding rim can be bent out of the plane of the sheet metal blank from the outer contour of said central opening; thereby forming supporting rim 22. The resulting central opening now defines hole 23. The steps of creating the central opening and the bending of the upstanding rim may be separate steps as indicated in the above. Alternatively, these two steps could be combined in a single manufacturing step, e.g. when using a punch.

In another step of the method the outer contour of the wall mounting bracket 1 in its unfolded state is removed from the sheet metal blank. This can for example be done by punching—using for example a hole punch—or by cutting using for example a laser cutter.

In yet another step of the method the mounting holes 7, 8 and/or fixing holes 20, 21 are formed. This can e.g. be done by punching or cutting said holes 7,8,20,21 in the flat sheet metal blank.

In another step of the method the flange profiles 9,10 of bracket 1 are formed by bending the sheet metal blank out of the plane about bending lines 13 and 14, for example by using a press. In the embodiment shown in FIGS. 1-4 the resulting flange profiles 9, 10 are tapered, which leads to increased bending stiffness of the socket 3 in the vertical direction. In a further step of the method the flange profiles 9,10 can be bent such that they are inclined towards each other from the proximal ends 11, 12 towards the embracing portions 17, 18; thereby providing further bracing to the socket, also in the lateral direction.

In yet a further step the flange profiles 9,10 are formed to a profile having a U-shaped cross section at the distal end portion thereof, by multiple bending of said distal ends 15, 16. This forms the embracing portions 17, 18, for which the open sides of the U-shaped profiles face each other. The bending for distal ends 15, 16 hence is effected in an opposite fashion. The U-shaped profiles can be formed by using a single, more complex, punch-and-die arrangement, or (a series of) multiple punch-and-die arrangements to effect the multiple bends.

The sequencing of method steps may differ from that disclosed in the previous sections.

The invention claimed is:

1. A metal wall mounting bracket for mounting an elongate mounting rail as a cantilever arm to a wall or other supporting surface, wherein the wall mounting bracket is adapted to position and hold an end portion of the mounting rail in the bracket and fix said end portion to the bracket by means of at least one mechanical fastener, wherein the wall mounting bracket comprises:
   a wall plate having a flat wall engagement side to be positioned against the wall or other support surface and a front side opposite the wall engagement side, wherein mounting holes extend from the front side to the wall engagement side for mounting the bracket to the wall by means of male fasteners,
   a socket located on the front side of the wall plate for inserting the end portion of the mounting rail perpendicularly to the front side of the wall plate, said socket comprising at least two flange profiles formed monolithically with the wall plate at opposite edges of the wall plate, and having a proximal end connected to the wall plate and a distal end remote from the wall plate, wherein the flange profiles at the distal end have an embracing portion configured to embrace together the end portion of the mounting rail, so as to interlock with the end portion of the mounting rail thereby inhibiting movement of an inserted end portion parallel to the wall plate, and wherein at least one of the embracing portions has a fixing hole for passing through a male fastener to fix the end portion of the mounting rail so as to inhibit retraction of the end portion from the socket,
   a supporting rim formed monolithically on the front side of the wall plate within the socket, said supporting rim being configured to interlock with the outer side or the inner side of the end portion of the mounting rail thereby inhibiting movement of an inserted end portion parallel to the mounting plate.

2. The wall mounting bracket according to claim 1, wherein the supporting rim is formed as a bent rim of a hole in the plate.

3. The wall mounting bracket according to claim 1, wherein the flange profiles are formed by bending.

4. The wall mounting bracket according to claim 1, wherein the bracket is made by casting or moulding.

5. The wall mounting bracket according to claim 1, wherein the flange profiles taper from the respective proximal end towards the embracing portions.

6. The wall mounting bracket according to claim 1, wherein the flange profiles are inclined towards each other from the proximal ends towards the embracing portions.

7. The wall mounting bracket according to claim 1, wherein the socket comprises two opposite flange profiles.

8. The wall mounting bracket according to claim 1, wherein the embracing portions have a U-shaped profile, wherein the open sides of the U-shaped profiles face each other.

9. The wall mounting bracket according to claim 1, wherein the support rim has a rectangular shape.

10. The wall mounting bracket according to claim 1, wherein the rim is aligned with the embracing portion of the flange profile.

11. The wall mounting bracket according to claim 1, wherein an inner side of the supporting rim is configured to interlock with an outer side of the end portion of the mounting rail.

12. The wall mounting bracket according to claim 1, wherein an outer side of the supporting rim is configured to interlock with an inner side of the end portion of the mounting rail.

13. The wall mounting bracket according to claim 1, formed from a sheet metal blank.

14. The wall mounting bracket according to claim 13, wherein the sheet metal blank is pre-galvanised.

15. A cantilever arm assembly comprising a wall mounting bracket according to claim 1, and a mounting rail which is inserted with an end portion in the socket and is supported by the supporting rim of the bracket.

16. The assembly according to claim 15, wherein the mounting rail has a C-shaped cross section.

17. A method for manufacturing a metal wall mounting bracket for mounting an elongate mounting rail as a cantilever arm to a wall or other supporting surface, wherein the wall mounting bracket is adapted to position and hold an end portion of the mounting rail in the bracket and fix said end portion to the bracket by means of at least one mechanical fastener, wherein:
   a flat sheet metal blank is provided, the sheet metal blank having a plane;
   a central opening with an upstanding rim is punched in the blank, said upstanding rim being configured to interlock with an outer side or an inner side of the end portion of the mounting rail,
   the outer contour of a wall plate and flange profiles on opposite sides of the wall plate of the unfolded wall mounting bracket is punched or cut from the blank;
   one or more mounting holes and one or more fixing holes are punched or cut,
   the wall plate is maintained in the plane of the sheet metal blank and the flange profiles are bent out of the plane of the sheet metal blank, such that the flange profiles have a proximal end connected to the wall plate and a distal end remote from the wall plate, the flange profiles are formed to a profile each having a U-shaped cross section at the distal end portion thereof, whereby the distal end portions of the flange profiles are configured to embrace together the end portion of the mounting rail.

18. The method according to claim 17, wherein the sheet metal blank is made of a pre-galvanised metal.

* * * * *